US008359479B2

(12) United States Patent
Grinchuk et al.

(10) Patent No.: US 8,359,479 B2
(45) Date of Patent: Jan. 22, 2013

(54) HIGH PERFORMANCE ARITHMETIC LOGIC UNIT (ALU) FOR CRYPTOGRAPHIC APPLICATIONS WITH BUILT-IN COUNTERMEASURES AGAINST SIDE CHANNEL ATTACKS

(75) Inventors: Mikhail I. Grinchuk, San Jose, CA (US); Anatoli A. Bolotov, Cupertino, CA (US); Lav D. Ivanovic, Sunnyvale, CA (US); Paul G. Filseth, Los Gatos, CA (US)

(73) Assignee: LSI Corporation, Milpitas, CA (US)

( * ) Notice: Subject to any disclaimer, the term of this patent is extended or adjusted under 35 U.S.C. 154(b) by 868 days.

(21) Appl. No.: 12/218,756

(22) Filed: Jul. 17, 2008

(65) Prior Publication Data

US 2010/0017622 A1 Jan. 21, 2010

(51) Int. Cl.
*G06F 12/14* (2006.01)
(52) U.S. Cl. ............................................. 713/189; 708/7
(58) Field of Classification Search .................. 713/189, 713/193, 194; 380/37; 708/230, 491, 7, 708/108
See application file for complete search history.

(56) References Cited

U.S. PATENT DOCUMENTS

| 3,662,349 | A  | * | 5/1972 | Bartlett et al. ................ 713/600 |
| 4,355,389 | A  | * | 10/1982 | Sato et al. ...................... 714/31 |
| 6,292,868 | B1 | * | 9/2001 | Norman ......................... 711/103 |
| 6,349,318 | B1 | * | 2/2002 | Vanstone et al. ............. 708/492 |
| 6,857,110 | B1 | * | 2/2005 | Rupp et al. .................... 716/136 |
| 7,185,039 | B2 |   | 2/2007 | Grinchuk |
| 2002/0059145 | A1 | * | 5/2002 | Leon ............................... 705/60 |
| 2003/0037227 | A1 | * | 2/2003 | Nomura ......................... 712/244 |
| 2004/0136530 | A1 | * | 7/2004 | Endo et al. ...................... 380/44 |
| 2006/0133160 | A1 | * | 6/2006 | Dickin et al. ............. 365/189.05 |
| 2007/0266225 | A1 | * | 11/2007 | Ko et al. ......................... 712/220 |
| 2008/0191737 | A1 | * | 8/2008 | Vorbach .......................... 326/38 |
| 2009/0240928 | A1 | * | 9/2009 | Fischer et al. ................. 712/226 |
| 2009/0268900 | A1 | * | 10/2009 | Lambert ........................... 380/28 |

OTHER PUBLICATIONS

Joye et al, Hessian Elliptic curves and side-channel attacks, 2001, Springer-verlag Berlin Heidelberg 2001, pp. 402-410.*
Paul Kocher, et al., Differential Power Analysis, Advances in Cryptology—Crypto'99, 1999, pp. 388-397, vol. 1666, No. Crypto'99, Published in: US.
Paul C. Kocher, Timing Attacks on Implementations of Diffie-hellman, RSA, DSS, and Other Systems, Advances in Cryptology—Crypto'96, 1996, pp. 104-113, vol. 1109, No. Crypto'96, Published in: US.

* cited by examiner

*Primary Examiner* — Eleni Shiferaw
*Assistant Examiner* — Abu Sholeman
(74) *Attorney, Agent, or Firm* — Suiter Swantz pc llo

(57) ABSTRACT

The present invention is a cryptoengine configured for providing countermeasures against attacks, including: an input/output (I/O) control unit, a memory, a controller, and an Arithmetic Logic Unit (ALU). The memory is communicatively coupled with the I/O control unit, receives inputs from the I/O control unit, and provides outputs to the I/O control unit based upon the received inputs. The controller is communicatively coupled with the I/O control unit for transmitting and receiving control signals. The ALU includes a plurality of storage components and computational components. The ALU is communicatively coupled with the controller and receives commands from/transmits status bits and flags to the controller. The ALU is further communicatively coupled with the memory and is configured for providing output signals to/receiving input signals from the memory. Further, the cryptoengine is configured for being communicatively coupled with a host computing device.

25 Claims, 3 Drawing Sheets

US 8,359,479 B2

HIGH PERFORMANCE ARITHMETIC LOGIC UNIT (ALU) FOR CRYPTOGRAPHIC APPLICATIONS WITH BUILT-IN COUNTERMEASURES AGAINST SIDE CHANNEL ATTACKS

FIELD OF THE INVENTION

The present invention relates to the field of digital circuits and particularly to a high performance Arithmetic Logic Unit (ALU) for supporting cryptographic applications, said ALU configured with built-in countermeasures against side channel attacks.

BACKGROUND OF THE INVENTION

Security applications may require massive multi-digit algebraic computations. Currently, software or firmware solutions may be implemented on general-purpose processors for providing such functionality. However, a number of these current solutions are inefficient (ex.—are slow) and/or they may not provide a desired level of security. Further, general-purpose processors (including required memory) may be bulky and may have high power consumption levels.

Therefore, it may be desirable to provide a solution which addresses the above-referenced problems associated with current solutions.

SUMMARY OF THE INVENTION

Accordingly, an embodiment of the present invention is directed to a cryptoengine configured for providing countermeasures against attacks, including: an input/output (I/O) control unit; a memory, the memory configured for being communicatively coupled with the I/O control unit and further configured for receiving an input from the I/O control unit and for providing an output to the I/O control unit in response to said input; a controller, the controller configured for being communicatively coupled with the I/O control unit for transmitting and receiving control signals; and an Arithmetic Logic Unit (ALU) including a plurality of storage components and a plurality of computational components, the ALU configured for being communicatively coupled with the controller, the ALU further configured for receiving commands from the controller and for providing at least one of status bits and flags to the controller, the ALU further configured for being communicatively coupled with the memory, the ALU further configured for providing output signals to the memory and for receiving input signals from the memory, wherein the cryptoengine is configured for being communicatively coupled with a host computing device.

A further embodiment of the present invention is directed to an Arithmetic Logic Unit (ALU) configured for providing countermeasures against side channel attacks, including: a plurality of main datapath units; a plurality of address registers, the address registers configured for communicatively coupling with a controller and for receiving address commands from the controller, the address registers further configured for communicatively coupling with a memory and for outputting address output signals to the memory; an opcode decoder, the opcode decoder configured for communicatively coupling with the controller and for receiving opcode commands from the controller, the opcode decoder further configured for communicatively coupling with the plurality of main datapath units and for outputting gating signals to the main data path units, the opcode decoder further configured for communicatively coupling with the memory and for providing initialize enable signals to the memory; and a plurality of iteration counters, the iteration counters configured for communicatively coupling with the memory and for receiving input signals from the memory and for transmitting an output to the controller in response to said received input signals.

An additional embodiment of the present invention is directed to an Arithmetic Logic Unit (ALU) configured for providing countermeasures against side channel attacks, including: a plurality of main datapath units; a plurality of address registers, the address registers configured for communicatively coupling with a controller and for receiving address commands from the controller, the address registers further configured for communicatively coupling with a memory and for outputting address output signals to the memory; an opcode decoder, the opcode decoder configured for communicatively coupling with the controller and for receiving opcode commands from the controller, the opcode decoder further configured for communicatively coupling with the plurality of main datapath units and for outputting gating signals to the main data path units, the opcode decoder further configured for communicatively coupling with the memory and for providing initialize enable signals to the memory; a plurality of iteration counters, the iteration counters configured for communicatively coupling with the memory and for receiving input signals from the memory and for transmitting an output to the controller in response to said received input signals; and a plurality of status bit registers, the status bit registers configured for communicatively coupling with the main datapath units and for receiving output signals from the main datapath units, the status bit registers further configured for being communicatively coupled to the opcode decoder and for receiving opcode control signals from the opcode decoder, the status bit registers further configured for providing status bit register output signals to the controller based upon the received main datapath unit output signals.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
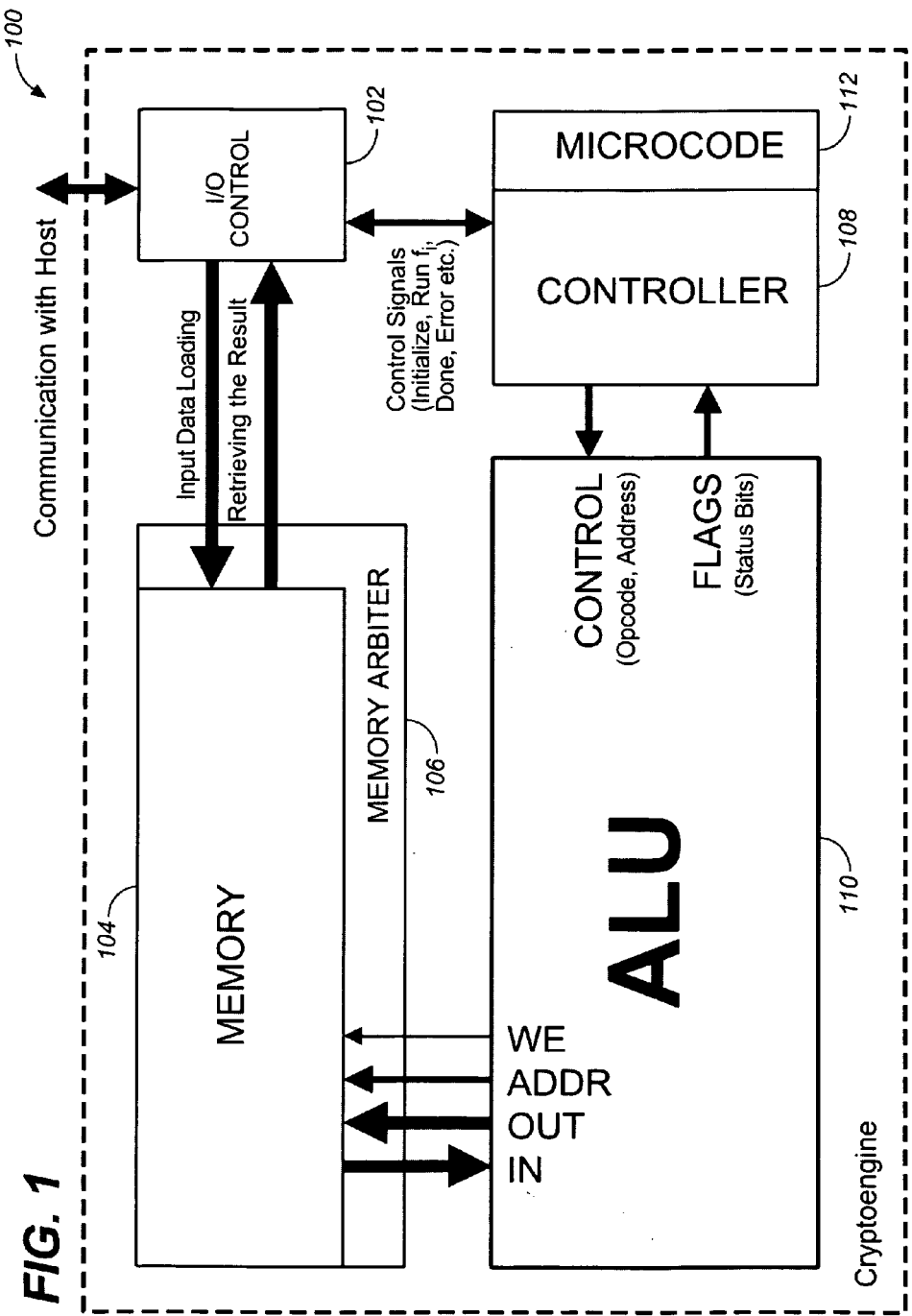
FIG. 1 is a diagram of a cryptoengine/cryptoengine system in accordance with an exemplary embodiment of the present invention.

Security applications may require massive multi-digit algebraic computations. Currently, software or firmware solutions may be implemented on general-purpose processors for providing such functionality. However, a number of these current solutions are inefficient (ex.—are slow) and/or they may not provide a desired level of security against different attacks, such as newly-identified classes of side-channel attacks. Further, general-purpose processors (including required memory) may be bulky and may have high power consumption levels.

The present invention is directed to provide a specialized Arithmetic Logic Unit (ALU) which may be used for hardware support of multi-precision algebraic computations required by security applications such as Elliptic Curve Cryptography (ECC) or RSA protocols. The ALU of the present invention may promote better performance and may be less complex than those implemented in general-purpose processors. Further, the ALU of the present invention may allow for an extra level of critical data protection (ex.—superior data protection as compared to software solutions) by providing built-in countermeasures against side-channel attacks (or other unauthorized access), and also because of the fact that hardware is generally less actively attacked than software. Further, the hardware implementation of the ALU of the present invention may allow for scrambling of signals on highly visible wires, such as buses between processing units and memories.

The proposed ALU/ALU module of the present invention, which may be implemented with an appropriate control unit as part of a cryptoengine, is optimized for achieving maximum computational performance/efficiency, such that it may be 10-100 times faster than software solutions. For example, the ALU of the present invention may include built-in support of very long arithmetic/algebraic computations in security applications, such as comparing, adding or loading/storing 512-bit numbers, which are tasks the ALU of the present invention may be able to perform in a single clock cycle. Further, even more complex operations such as multiplication of 512-bit numbers may be performed by the ALU of the present invention in just a few clock cycles. (with speed of multiplication being related to/depending on gate count). Still further, the ALU of the present invention may be designed to support computation schedules such that the largest (highest gate count) blocks are not losing performance due to idle clock cycles. Additionally, the ALU of the present invention may provide for a compact implementation which may promote low power consumption. Further, the ALU/cryptoengine of the present invention may include circuitry designed for providing maximum support of countermeasures against side-channel attacks, said circuitry or countermeasures may include: a built-in random generator, special randomized internal representation of data, limited access to data from outside, customized set(s) of supported microcommands, etc. Still further, the ALU/cryptoengine architecture of the present invention may be used for any applications requiring massive specialized computations.

Referring generally to FIG. 1, a cryptoengine 100 in accordance with an exemplary embodiment of the present invention is shown. In a current embodiment of the present invention, the cryptoengine 100 may include an input/output (I/O) control unit 102 (ex.—I/O CONTROL, as shown in FIG. 1), a memory 104, a memory arbiter 106, a controller 108, and an Arithmetic Logic Unit (ALU)/ALU module 110. The cryptoengine 100 may be configured for interfacing/being communicatively coupled, such as via the I/O control unit 102, with a host computing device.

In exemplary embodiments of the present invention, the I/O control unit 102 and the controller 108 may be configured for being communicatively coupled to each other, such that control signal(s) (ex.—initialize, run operation, done, error, etc.) may be transmitted between the I/O control unit 102 and the controller 108. Further, the I/O control unit 102 and the memory 104 may be configured for being communicatively coupled to each other, such that said I/O control unit 102 may provide/load/transmit input data to the memory 104 and may receive a result, said result being transmitted/retrieved from said memory 104.

In current embodiments of the present invention, the controller 108 is configured for being communicatively coupled with the ALU 110. The controller 108 may be configured for providing command(s)/control signal(s) (ex.—CONTROL, as shown in FIG. 1) to the ALU 110. Further, the controller 108 may be configured for receiving status bits/flags from the ALU 110. In additional embodiments, the controller 108 may be configured for executing microcode 112. The microcode 112 may be programs in/of the controller 108.

Figure 2:
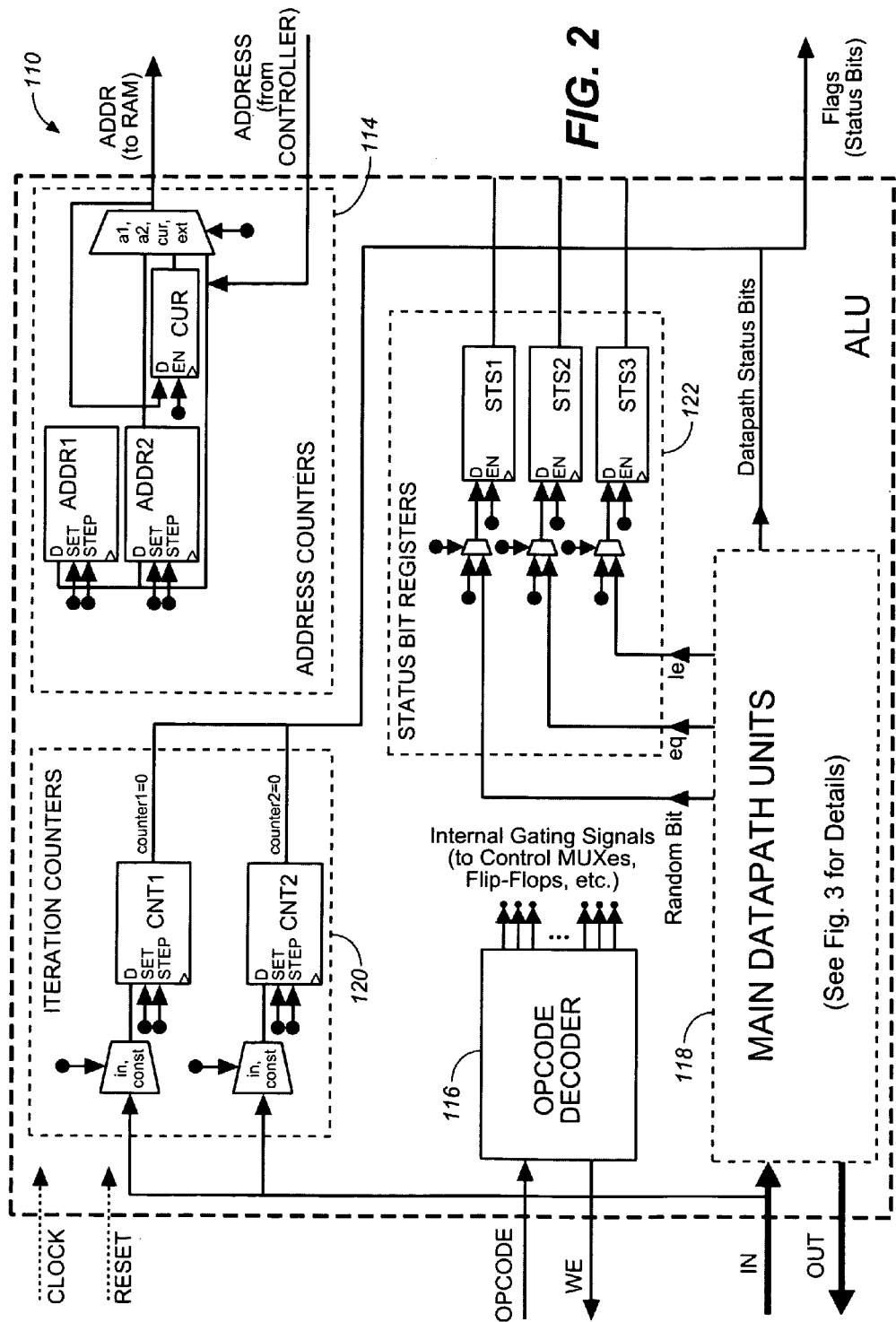
FIG. 2 is a diagram of an Arithmetic Logic Unit (ALU) of the present invention which may be implemented in/with the cryptoengine shown in FIG. 1 in accordance with an exemplary embodiment of the present invention.

In further embodiments of the present invention, the ALU 110 may be configured for being communicatively coupled with the controller 108 and for providing/outputting status bits/flags to the controller 108. Further, the ALU 110 may be configured for receiving input(s)/command(s)/control signal(s) provided by the controller 108. For example, the ALU 110 may be configured for receiving opcode command(s)/signal(s) (ex.—OPCODE, as shown in FIGS. 1 and 2) provided by the controller 108 or address command(s)/signal(s) (ex.—ADDRESS, as shown in FIGS. 1 and 2) provided by the controller 108. In additional embodiments, the ALU 110 and the memory 104 may be communicatively coupled such that signals may be transmitted between the memory 104 and the ALU 110. For instance, the ALU 110 may be configured for providing/transmitting an address output signal(s) (ex.—ADDR, as shown in FIGS. 1 and 2) to the memory 104.

In exemplary embodiments of the present invention, the memory arbiter 106 may be configured for controlling access (ex.—access by other components, such as the ALU 110 or I/O control unit 102, of the cryptoengine 100) to the memory 104.

Referring generally to FIG. 2, the ALU 110 in accordance with an exemplary embodiment of the present invention is shown. In a current embodiment of the present invention, the ALU 110 may include a plurality of address registers/address counters 114. The plurality of address registers 114 may be configured for receiving address command(s)/signal(s) (ex.—ADDRESS, as shown in FIG. 2) from the controller 108. In exemplary embodiments, one or more address counters/address registers (ex.—ADDR1 and ADDR2) included in the plurality of address counters/address registers 114 may be configured for providing auto-decrement functionality. In further embodiments, a main address register (ex.—CUR) configured for maintaining a current address may be included in the plurality of address counters/registers 114. In alternative embodiments, one or more of the plurality of address registers 114 may be configured for providing auto-increment functionality for accessing the memory 104 (ex.—RAM).

In additional embodiments of the present invention, the plurality of address registers 114 is configured for outputting address output signal(s) (ex.—ADDR, as shown in FIGS. 1 and 2) to the memory 104 (ex.—RAM). The address output signal(s) may be output/generated in response to and/or based upon the address input signal(s) (ex.—ADDRESS, as shown in FIGS. 1 and 2) received from the controller 108. In exemplary embodiments, the address registers 114 may enable operations over two multi-location blocks of data (like copying) without having address input signal(s) (ex.—ADDRESS) provided/sent to said address registers 114 too often. In exemplary embodiments, the controller 108 may share the same bits in full code of command both for ADDRESS and for other purposes, depending on OPCODE. Further, one or more of the address registers 114 (ex.—ADDR1, ADDR2) may be controlled via internal inputs (ex.—SET and STEP). For example, when one of the address registers 114 receives an internal input specifying that SET=1, then that address register is set to the value specified by the received address input signal (ex.—ADDRESS). Further, when one of the address registers 114 receives an internal input specifying that STEP=1, then that address register's value is decremented by one.

In current embodiments of the present invention, the ALU 110 may include an opcode decoder 116. For instance, the opcode decoder 116 may be configured as a combinational sub-circuit. Further, the opcode decoder 116 may be configured for receiving opcode command(s)/signal(s) (ex.—OPCODE, as shown in FIG. 2) from the controller 108. In exemplary embodiments, the opcode decoder 116 may be configured for providing/generating various control signals/gating signal(s). In additional embodiments, the opcode decoder 116 may be configured for being communicatively coupled to main datapath units 118 of the ALU 110. Further, the opcode decoder 116 may be configured for outputting said gating signals to the main datapath units 118 of the ALU 110. The gating signal(s) may be produced/output in response to and/or based upon the received opcode command(s). For instance, the gating signals may be: control signals for multiplexers (MUXes), control signals for flip-flop circuits or the like. Further, the opcode decoder 116 may be configured for being communicatively coupled with the memory 104 and may provide initialize enable signals (such as a Write Enable signal (WE), as shown in FIGS. 1 and 2) for registers of the memory 104. In exemplary embodiments, the opcode decoder 116 may be configured as a decoder (ex.—n-to-$2^n$ circuit) followed by a set of OR-trees, such as one OR-tree per each required signal, or in an alternative optimized configuration.

Figure 3:
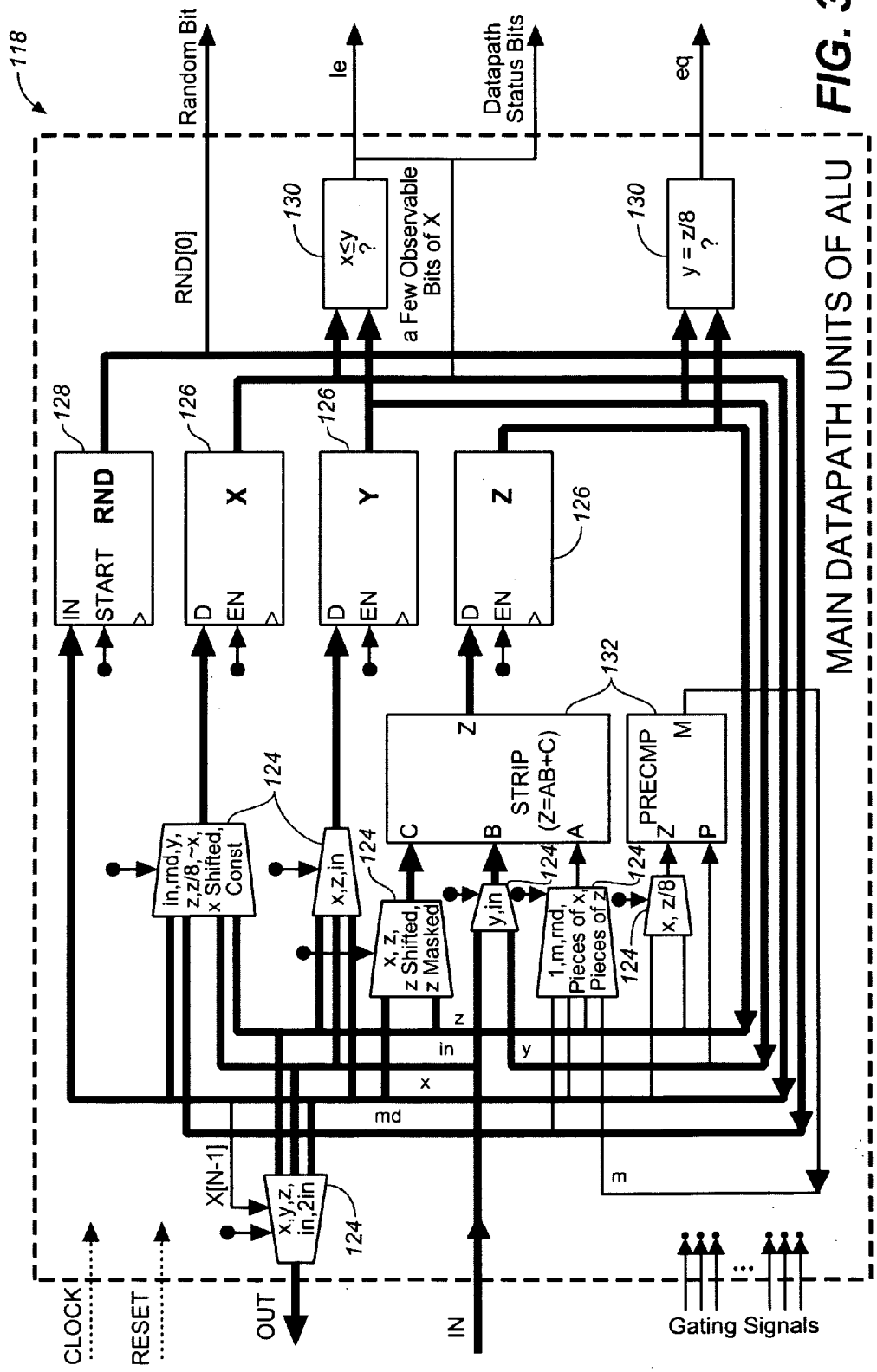
FIG. 3 is a diagram of Main Datapath Units of the present invention which may be implemented in/with the ALU shown in FIG. 2 in accordance with an exemplary embodiment of the present invention.

In further embodiments of the present invention, the main datapath units 118 of the ALU 110 may be configured for being communicatively coupled to the memory 104. Further, the main datapath units 118 may be configured for receiving input(s) provided/transmitted by the memory 104 (ex.—IN, as shown in FIGS. 1-3). In additional embodiments, the main datapath units 118 of the ALU 110 may be configured for providing/transmitting output(s) to the memory 104. (ex.—OUT, as shown in FIGS. 1-3). For example, the output(s) may be value(s) to be written to/written back into memory 104 (ex.—RAM).

In exemplary embodiments of the present invention, the ALU 110 may include a plurality of iteration counters/registers 120. For example, the iteration registers 120 may be independent registers which may count up or count down. The iteration registers 120 may be configured for being communicatively coupled with the memory 104 and each iteration register 120 may further be configured for receiving an input/certain bits of the input signal (ex.—the input signal being IN, as shown in FIG. 2) from the memory 104. For instance, the iteration registers 120 may be initialized to either an arbitrary input value (via the input/certain bits of the input signal received from the memory 104) or may be initialized to one or more predefined constant values/constants. In further embodiments, each iteration register/counter 120 may be configured for providing/outputting/transmitting an output signal (ex.—which may be part of the signal indicated as "flags (status bits)", as shown in FIGS. 1 and 2), such as a single-bit output signal, to the controller 108 in response to/based upon the received input signal. For example, the output signal transmitted/output by an iteration register/counter included in the plurality of iteration registers 120 may provide an indication as to whether or not that iteration register's value has reached its limit (ex.—whether or not the value has reached zero (0) yet when the iteration register 120 is a count down register). Further, the iteration counters 120 may be configured to support loops (ex.—"do n times").

In additional embodiments of the present invention, the main datapath units 118 are configured for being communicatively coupled to the controller 108. Further, the main datapath units 118 may be configured for providing/outputting datapath status bit(s) in response to/based upon the input(s) provided/transmitted by the memory 104 (ex.—IN, as shown in FIGS. 1-3). The datapath status bit(s) may be output/transmitted to the controller 108. (For example, the datapath status bit(s) may be transmitted to the controller 108 as part of the output signal indicated as "flags (status bits)", as shown in FIGS. 1-3). In further embodiments, the main datapath units 118 may be configured for being communicatively coupled to one or more status bit registers 122. Further, the main datapath units 118 may be configured for providing/outputting one or more main datapath unit output signals/essential datapath signals (ex.—random bit, eq, le, as shown in FIGS. 2 and 3) to the status bit registers 122 in response to/based upon the input(s) (ex.—IN, as shown in FIGS. 1-3), provided/transmitted by/from the memory 104.

In current embodiments of the present invention, the status bit registers 122 (ex.—STS1, STS2, STS3, as shown in FIG. 2) may be configured for being communicatively coupled with the main datapath units 118 and may be further configured for receiving the main datapath unit output signals (ex.—random bit, eq, le, as shown in FIGS. 2 and 3) transmitted by/from the main data path units 118. In exemplary embodiments, the status bit registers 120 may be flip-flop circuits which are configured for holding bits of the state of the ALU 110. In further embodiments, the status bit registers 120 may be configured for receiving OPCODE control signals/values output by the opcode decoder 116. For instance, the status bit registers 122 may receive commands such as "save the current value of this datapath signal in the flip-flop", "set the flip-flop to 0", "set the flip-flop to 1". In additional embodiments, control logic of the cryptoengine 100/ALU 110 may be configured to have certain limitations to allow confidence that a value (ex.—"1") of a flip-flop has been produced only in a special way. For example, if a flip-flop is driven only by "set to 0" and "save output from comparator" signals, than definitely its value equal to 1 means that it was a comparator that initially produced this value. Such limitations may be useful for enhancing protection against certain attacks. In exemplary embodiments, the status bit registers 122 may be configured for providing status bit register output signal(s) in response to/based upon the received main datapath unit output signals (ex.—random bit, eq, le, as shown in FIGS. 2 and 3). Further, the status bit register output signal(s) may be output/transmitted to the controller 108, for instance, as part of the output signal indicated as "flags (status bits)", as shown in FIGS. 1-3).

Referring generally to FIG. 3, the main datapath units 118 of the ALU 110, in accordance with an exemplary embodiment of the present invention, are shown. The main datapath units 118 may be organized around several registers (said registers having different lengths and different purposes). The number of registers implemented, the size of the registers implemented and the functionality of the registers may depend on applications, performance requirements, and area/power/gate count constraints. FIG. 3 illustrates an exemplary configuration for the main datapath units 118, which may be adapted for Elliptic Curve Cryptography (ECC), such as for performing ECC computations in a standard finite field $Z_p$ using techniques such as those described in U.S. Pat. No. 7,185,039, which is herein incorporated by reference.

In exemplary embodiments of the present invention, the main datapath units 118 of the ALU 110 include one or more datapath multiplexers (datapath MUXes) 124, one or more data registers 126 (ex.—X, Y, Z, as shown in FIG. 3), a shift register for a pseudo-random number generator 128 (ex.—RND, as shown in FIG. 3), one or more comparators 130, and one or more calculating units 132/application-specific arithmetical components (ex.—STRIP, PRECMP). Further, the datapath MUX(es) 124 and the calculating unit(s) 132 may be communicatively coupled as shown in FIG. 3 to collectively form application-specific logic sub-circuitry/sub-circuit(s). Further, the data register(s) 126 and the shift register for the pseudo-random number generator 128 may be communicatively coupled with the application-specific logic sub-circuitry and may be driven by sub-circuitry output(s)/configured for receiving sub-circuitry output(s) provided by the application-specific logic sub-circuitry, said sub-circuitry output(s) being provided in response to/based upon input(s) (ex.—IN, as shown in FIG. 3) transmitted from the memory 104 and received by the main datapath units 118.

In exemplary embodiments, the data register(s) 126 and/or shift register 128 may be communicatively coupled with the comparator(s) 130. Further, the data register(s) 126 and/or shift register 128 may be configured for providing/transmitting a register output(s) to the comparator(s) 130. In additional embodiments, the data register(s) 126 and/or shift register 128 may be configured for providing/transmitting a register output(s) to the status bit registers 122. For example, the shift register for the pseudo-random number generator 128 may provide/transmit a random bit register output (ex.—random bit, as shown in FIGS. 2 and 3) to the status bit registers 122. Further, the comparator(s) 130 may be configured for receiving register output(s) and may further be configured for transmitting/providing a comparator output(s) (ex.—le, eq as shown in FIGS. 2 and 3). to the status bit registers 122. The comparator output(s) transmitted/provided to the status bit registers 122 may be provided in response to/based upon the received register output(s). In still further embodiments, the data register(s) 126 and/or shift register 128 may be configured for providing/transmitting datapath status bits register output(s), which may be output to controller 108 as part of the output signal indicated as "flags (status bits)", as shown in FIGS. 1-3. For instance, a datapath status bits register output may include one or more observable bits of one of the data registers 126 or of the shift register 128. In further embodiments, the comparator(s) 130 may be configured for providing/transmitting datapath status bits comparator output(s) (ex.—datapath status bits, as shown in FIGS. 2 and 3), which may be output to the controller 108 as part of the output signal indicated as "flags (status bits)", as shown in FIGS. 1-3. In additional embodiments, a datapath MUX 124 included in the one or more datapath MUXes 124 may be configured for providing/transmitting/producing output signal(s)/value(s) (ex.—OUT, as shown in FIGS. 1-3) to the memory 104. For instance, the output value may be a main output value which may be written back into the memory 104 (ex.—RAM). The output signal(s) may be provided in response to/based upon input(s) (ex.—IN, as shown in FIGS. 1-3) transmitted from the memory 104 and received by the main datapath units 118.

In further embodiments, the registers of the main datapath units 118 may be driven (in different ways) by outputs of application-specific logic sub-circuits. For instance, this may include: a MUX selecting one of a plurality of possible input values to download (ex.—register Y), or a MUX having different modes (select full word, certain subwords (using pre-defined masks), shifted word (by a predefined constant), bit-wise inverted word, etc. Further, register X 126 and register RND 128 may allow for loading of pre-defined constants, their new values being taken either from bus X or being computed from a previous value using shifting and XORing: new_val[size-1:0]={old_val[size-2:0], FEEDBACK} where FEEDBACK is a linear function (ex.—XOR) of some bits from old_val. Further, the main datapath units 118 may provide a result of a computation (ex.—multiplication) where inputs are MUXes or other computations. For instance, a register 126 such as register Z may be driven by calculating unit 132 (ex—STRIP (Z=AB+C)), where A, B and C are all MUXes, and MUX A/the MUX for A may contain among its inputs the value M, such that M is greater than 0, but less than 16, such that MP+Z is divisible by 8 provided that P is even.

In current embodiments of the present invention, the ALU 110 may be driven by a CLOCK signal and a RESET signal as shown in FIGS. 2 and 3. Further, other components of the cryptoengine 100 (such as the controller 108, etc.) may be driven by the same CLOCK signal and RESET signal. Further, the ALU 110 may share an ENABLE signal with one or more other components of the cryptoengine 100, or the ALU 110 may calculate/compute said ENABLE signal internally. For example, if the ALU 110 receives a command from the controller 108, and said command is recognized by the ALU 110 as no operation (NOP), then ENABLE=0, otherwise ENABLE=1.

In exemplary embodiments, the ALU 110 may be configured for receiving and executing a single command/control signal transmitted from the controller 108 at each clock cycle. For example, the received command, when executed by the ALU 110, may cause the ALU 110 to perform any of a number of various actions such as: updating values of internal registers (ex.—data registers 126) of the ALU 110; read/write access to the memory 104 (ex.—from the side of the ALU 110, the memory 104 may look like regular 1-port RAM); produce/output a few status bits/flags to the controller 108 to allow for control of program execution flow by the controller 108. For instance, the status bits/flags transmitted by/output to the controller 108 from the ALU 110 may include most important results of computation (such as "done", "error detected", signature accepted/rejected", etc.), may indicate results of comparison(s), end conditions of loops, etc.

In additional embodiments, any one or more of the data registers 126, the shift register 128, the address registers 114, the iteration registers 120 and status bit registers 122 may be a storage component(s) of the ALU 110. Further, any one or more of the opcode/decoder 116/gating signals generator, the calculating units 132/application-specific arithmetical components (ex.—STRIP, which may be a unit computing AB+C for shorter A and longer B and C; PRECMP, which may be a reduced modular division unit), the comparators 130 (ex.—"=" and "≧"), and the datapath MUXes 124 may be a computational component(s) (ex.—plain logic) of the ALU 110.

In exemplary embodiments, the ALU 110 may be configured for performing basic data transfers (ex.—y=x), memory access operations (ex.—X=RAM[addr] or X=RAM[addr--]), as well as compound actions such as "let Z=Y*most significant part of X; update X by a cyclical shift; decrement CNT1". The ALU 110 of the present invention may enable support of efficient modular multiplication (such as by using techniques as described in U.S. Pat. No. 7,185,039 which is incorporated by reference herein) without extra clock cycles for loop index alterations and checking. Another compound command useful for modular comparisons may be: if register Y contains an odd number and Z is a number not yet reduced modulo Y, then unit PRECMP computes (using a few least significant bits of Y and Z) such M that YM+Z is divisible by 64, and the value (YM+Z)/8 can go back to Z. Each repetitive use of this compound command may reduce Z, and finally it may reach either 8Y (if Z is divisible by Y) or a number larger than 8Y, but less than 9Y otherwise. The required number of iterations may be approximately (length of Z-length of Y)/3. Preliminary multiplication of Z by a pre-computed constant (depending on Y) may convert this procedure to the modular reduction: the last value of Z divided by 8 can be loaded into register X; then X−Y will be the result of modular reduction. Using similar (and simpler) methods, one may be able to support all arithmetical operations over $Z_p$ for long (128-bit, 160-bit, 256-bit, or greater depending on initial design specification) primes p. In further embodiments, by adding extra computation units, one may support computations over Galois fields or other operations.

The above-described cryptoengine 100/architecture may allow for embedding of hardware support of protection against attacks, such as timing analysis attacks, power analysis attacks, side-channel attacks, attacks via observation of some internal signals, or other non-authorized access. Countermeasures may include various techniques for combating such attacks. Hardware implementation of security computations via the architecture/cryptoengine 100 described above may provide some protection against such attacks, because an attacker may have less access to on-chip signals inside specialized chips than the attacker would have when standard software working with standard external memory is implemented (since said standard external memory may be removed and analyzed).

In exemplary embodiments, the cryptoengine 100/architecture described above may be implemented/adapted to promote increased security. For instance, the cryptoengine 100/architecture of the present invention may be designed such that sensitive values are not placed to components (ex.— registers, memories) which are observable from outside the chip. In the cryptoengine 100 shown in FIG. 1, all data communicated between the host and the cryptoengine 100 may go through the memory 104 (ex.—RAM). Therefore, hardware-supported access limitations may be implemented by the cryptoengine 100. For example, a set of all memory locations/memory addresses of the memory 104 may be divided into several zones, such that a first zone (ex.—zone 0) may allow for full access from outside the cryptoengine 100, such as for reading and writing. Further, a second zone (ex.—zone 1) may be written from outside the cryptoengine 100 and a third zone (ex.—zone 2) may be read from outside the cryptoengine 100. Still further, a fourth zone (ex.—zone 3) may be utilized for providing internal storage only, and may be configured so as to not be visible at all from outside the cryptoengine 100.

A further technique for protection from attacks which may be implemented with/supported by the cryptoengine 100/architecture of the present invention includes cleaning of storage components. For instance, software-style cleaning may be implemented wherein, after the completion of a computation, zero (0) may be written to all related memory locations of the cryptoengine 100 which are allocated for internal variables. Further, scheduled hardware reset of storages and registers of the cryptoengine 100 may be implemented. Still further, the cryptoengine 100 of the present invention may allow for/implement internal representation of its sensitive data, such that said sensitive data may be scrambled, to promote prevention of non-authorized access to said sensitive data. For example, the cryptoengine 100/architecture of the present invention may support special representations of numbers during computations, such as, if the prime p has N bits and all main computations are made modulo p, then intermediate results may be reduced to M-bit numbers where M>N. In additional embodiments, randomness of the intermediate results may be increased by adding "random*p" to some of them, which, in computations modulo p (and when the random generator is differently initialized each time) will result in non-identical computation flow, even for the same inputs. Alternatively, for special representations, one or more bits (at least important bits) may be represented by multi-bit vector(s). For instance, if both 00 and 11 are used to represent 0, both 01 and 10 are used to represent 1, and the choice of variants is purposely random, this may promote prevention of the discovery of sensitive information of the cryptoengine 100 by an attacker who/which may be observing one individual bit.

Side-channel attacks may consist of disclosing protected data with the help of side-channel analysis (ex.—monitoring some side-channel information such as runtime, power consumption, electromagnetic radiation, etc.). The proposed architecture/cryptoengine 100 of the present invention may support countermeasures (either in the ALU 110 or via specially adjusted programs/microcode 112 of the controller 108) against such attacks. A first type of side-channel attack may be a timing attack/differential timing attack. Differential timing attacks may involve observation of runtime variations for different data. For example, if a computation of the ALU 100 includes a loop, such as "do N times something", then runtime samples for known values of N may allow for discovery of an unknown value of N through its corresponding runtime. In exemplary embodiments, the cryptoengine 100 of the present invention may promote prevention of such data attacks via utilization/implementation of computations wherein runtime is independent of input data. Further, the cryptoengine 100 of the present invention may allow for runtime to be randomized (ex.—via addition of actions such as "if a random bit is zero (0), then spend ten (10) clock cycles for some hiding computations") for hiding the runtime's dependencies on important parameters. In current embodiments of the present invention, a built-in random number generator may be implemented by the cryptoengine 100 for randomizing runtime.

Another type of side-channel attack may be a power attack. A power attack may occur when an attacker is observing power consumption during computation by the ALU 110. A higher level of power consumption may indicate that there are multiple gates changing the state of the ALU 110. In computations such as RSA or ECC (Elliptic Curve Cryptography) protocols, an exponentiation or similar "square-and-multiply" algorithm may be particularly vulnerable to power attacks, in that said exponentiation/algorithm may include sequential steps where each step may be performed for instance, in one of two different ways, depending on a respective bit of the key. Therefore, if the two ways/alternatives differ in power consumption, an attacker may discover the key by just observing a time-power plot. In exemplary embodiments, a first countermeasure against such power attacks may include performing both elementary computations/steps (ex.—for bit value 0 and 1) each time and only selecting a required output value. The cryptoengine 100 of the present invention may support said first countermeasure by including/implementing commands such as "send different data to RAM depending on a certain bit of X". Another countermeasure against such power attacks/another method to hide the value of the key may include replacing an expression such as $x^y$ (where y must be kept secret) with a product such as $x^r*x^{y-r}$, where r is a random number, rather than plain computing said expression. Other techniques/countermeasures implementable by the cryptoengine 100 of the present invention may be supportable for argument protection during other mathematical operations (ex.—multiplication, division), such as: replacing multiplication x*y with (x+r)*(y+q)−(x+r)*q−(y+q)*r+r*q, where r and q are random numbers; and replacing division x/y with (x*r)/(y*r), where r is a non-zero random number.

A further type of side-channel attack may be an electromagnetic attack. An electromagnetic attack may involve observing electromagnetic (EM) radiation so as to detect an activation schedule of larger pieces of a netlist. For instance, a sequence of addresses sent to memory units may be monitored, since each memory access may simultaneously "touch" multiple memory cells. A countermeasure against such electromagnetic attacks which may be implemented with/by the cryptoengine 100 of the present invention may include utilization/implementation of programs (such as those executed by the controller 108) in which the sequence of addresses is data-independent. For example, rather than running one of two alternative branches of code, the cryptoengine 100 of the present invention may run both branches and may then select only the appropriate output value. In hardware, similar techniques may include support of conditional assignments.

In exemplary embodiments, the above-describe communicative couplings, such as between elements/components of the cryptoengine 100 may be achieved via one or more buses. For example, the buses may have a bit width of a single bit, multiple bits, or hundreds of bits.

In further embodiments, the number and functionality of the iteration counters/registers 120 may be chosen with the goal(s) of adding performance (ex.—these registers 120 may operate in parallel with main computation, thereby eliminating the necessity for separate commands or clock cycles for modifying or checking loop index, without adding too many extra gates. A minimum reasonable number of iteration counters 120 which may be implemented in the ALU 110 of the present invention may be one iteration counter 120, such as a counter which counts down to zero.

In additional embodiments, any one or more of the data registers 126, address registers 114, iteration counters 120, shift register for pseudo-random number generator 128, and status bit registers 122 may be classified as storage components of the ALU 110 of the present invention.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A cryptoengine configured for providing countermeasures against attacks, said cryptoengine comprising:
an input/output (I/O) control unit;
a memory, the memory configured for being communicatively coupled with the I/O control unit and further configured for receiving an input from the I/O control unit and for providing an output to the I/O control unit in response to said input;
a controller, the controller configured for being communicatively coupled with the I/O control unit for transmitting and receiving control signals; and
an Arithmetic Logic Unit (ALU) including a plurality of storage components and a plurality of computational components, the plurality of storage components including status bit registers which are flip-flop circuits configured for holding bits of a state of the ALU, at least one of the flip-flop circuits being driven only by a set-to-zero signal and a save-output-from-comparator signal for providing protection against attacks, the ALU configured for being communicatively coupled with the controller, the ALU further configured for receiving commands from the controller and for providing at least one of status bits and flags to the controller, the ALU further configured for being communicatively coupled with the memory, the ALU further configured for providing output signals to the memory and for receiving input signals from the memory,
wherein the cryptoengine is configured for being communicatively coupled with a host computing device, and
wherein the cryptoengine is configured for embedding hardware support for promoting protection against said attacks, said attacks including at least one of: timing analysis attacks, power analysis attacks, side channel attacks, and internal signal observation attacks.

2. The cryptoengine as claimed in claim 1, further comprising:
a memory arbiter configured for controlling access to the memory.

3. The cryptoengine as claimed in claim 1, wherein the controller is configured for executing microcode, said microcode implementing data-independent address sequences.

4. The cryptoengine as claimed in claim 1, wherein the commands received by the ALU from the controller include at least one of: opcode commands and address commands.

5. The cryptoengine as claimed in claim 1, wherein the output signals provided by the ALU to the memory include address output signals and initialize enable signals.

6. The cryptoengine as claimed in claim 1, wherein the plurality of storage components of the ALU includes at least one of: data registers; address registers; iteration counters; a shift register for a pseudo-random number generator; status bit registers.

7. The cryptoengine as claimed in claim 1, wherein the plurality of computational components of the ALU includes at least one of: an opcode decoder; application-specific arithmetical components; comparators; and datapath multiplexers.

8. The cryptoengine as claimed in claim 7, wherein the opcode decoder is a gating signals generator.

9. The cryptoengine as claimed in claim 7, wherein the application-specific arithmetical components are calculating units.

10. The cryptoengine as claimed in claim 1, wherein the ALU is configured for providing hardware support of at least one of: algebraic computations required by Elliptic Curve Cryptography (ECC) protocol security applications; and algebraic computations required by RSA protocol security applications.

11. The cryptoengine as claimed in claim 1, wherein the memory includes a first set of memory addresses and a second set of memory addresses, each memory address included in the first set of memory addresses being accessible from outside the cryptoengine for at least one of reading and writing, each memory address included in the second set of memory addresses being non-accessible from outside the cryptoengine.

12. The cryptoengine as claimed in claim 1, wherein the cryptoengine includes a random number generator configured for randomizing a runtime of a computation.

13. The cryptoengine as claimed in claim 12, wherein said computation has an input data-independent runtime.

14. The cryptoengine as claimed in claim 1, wherein the cryptoengine is configured for hardware implementation of security computations.

15. The cryptoengine as claimed in claim 1, wherein the cryptoengine includes means for implementing internal representation of sensitive data.

16. The cryptoengine as claimed in claim 1, wherein the cryptoengine includes means for scrambling sensitive data for promoting prevention of access to said sensitive data.

17. The cryptoengine as claimed in claim 1, wherein the cryptoengine includes means for performing a scheduled hardware reset of storage components of the cryptoengine.

18. The cryptoengine as claimed in claim 1, wherein the cryptoengine includes means for completing a computation and writing zero to related memory locations of the cryptoengine that are allocated for internal variables.

19. The cryptoengine as claimed in claim 1, wherein the cryptoengine includes means for performing a sequential-step computation in at least two alternative ways to obtain at least two different output values; and means for selecting only a required output included in the at least two different output values.

20. An Arithmetic Logic Unit (ALU) configured for providing countermeasures against attacks, said ALU comprising:
a plurality of main datapath units;
a plurality of address registers, the address registers configured for communicatively coupling with a controller and for receiving address commands from the controller, the address registers further configured for communicatively coupling with a memory and for outputting address output signals to the memory;
an opcode decoder, the opcode decoder configured for communicatively coupling with the controller and for receiving opcode commands from the controller, the opcode decoder further configured for communicatively coupling with the plurality of main datapath units and for outputting gating signals to the main data path units, the opcode decoder further configured for communicatively coupling with the memory and for providing initialize enable signals to the memory;
a plurality of iteration counters, the iteration counters configured for communicatively coupling with the memory and for receiving input signals from the memory and for transmitting an output to the controller in response to said received input signals; and
a plurality of status bit registers, the status bit registers configured for communicatively coupling with the main datapath units and for receiving output signals from the main datapath units, the status bit registers further configured for being communicatively coupled to the opcode decoder and for receiving opcode control signals from the opcode decoder, the status bit registers further configured for providing status bit register output signals to the controller based upon the received main datapath unit output signals, the status bit registers being flip-flop circuits configured for holding bits of a state of the ALU, at least one of the flip-flop circuits being driven only by a set-to-zero signal and a save-output-from-comparator signal for providing protection against attacks,
wherein the main datapath units include at least one datapath multiplexer, and
wherein the main datapath units include at least one comparator and at least one calculating unit, the at least one calculating unit and the at least one datapath multiplexer collectively forming application-specific logic sub-circuitry.

21. The ALU as claimed in claim 20, wherein the main datapath units are configured for being communicatively coupled to the memory and are configured for receiving inputs from and transmitting main datapath unit outputs to the memory.

22. The ALU as claimed in claim 21, wherein the main datapath units are configured for outputting datapath status bits to the controller based upon the received inputs from the memory.

23. The ALU as claimed in claim 22, wherein the output signals received by the status bit registers from the main datapath units are based upon the received inputs from the memory.

24. The ALU as claimed in claim 20, wherein the main datapath units include at least one data register and a shift register for a pseudo-random number generator, the at least one data register and at least one shift register for a pseudo-random number generator configured for being communicatively coupled with the application-specific logic sub-circuitry and for receiving sub-circuitry outputs from the sub-circuitry, the sub-circuitry outputs being provided in response to the inputs received from the memory by the main datapath units.

25. An Arithmetic Logic Unit (ALU), configured for providing countermeasures against attacks, said ALU comprising:
a plurality of main datapath units;
a plurality of address registers, the address registers configured for communicatively coupling with a controller and for receiving address commands from the controller, the address registers further configured for communicatively coupling with a memory and for outputting address output signals to the memory;

an opcode decoder, the opcode decoder configured for communicatively coupling with the controller and for receiving opcode commands from the controller, the opcode decoder further configured for communicatively coupling with the plurality of main datapath units and for outputting gating signals to the main data path units, the opcode decoder further configured for communicatively coupling with the memory and for providing initialize enable signals to the memory;

a plurality of iteration counters, the iteration counters configured for communicatively coupling with the memory and for receiving input signals from the memory and for transmitting an output to the controller in response to said received input signals; and a plurality of status bit registers, the status bit registers configured for communicatively coupling with the main datapath units and for receiving output signals from the main datapath units, the status bit registers further configured for being communicatively coupled to the opcode decoder and for receiving opcode control signals from the opcode decoder, the status bit registers further configured for providing status bit register output signals to the controller based upon the received main datapath unit output signals, the status bit registers being flip-flop circuits configured for holding bits of a state of the ALU, at least one of the flip-flop circuits being driven only by a set-to-zero signal and a save-output-from-comparator signal for providing protection against attacks, wherein the main datapath units include at least one datapath multiplexer, and wherein the main datapath units include at least one comparator and at least one calculating unit, the at least one calculating unit and the at least one datapath multiplexer collectively forming application-specific logic sub-circuitry.

* * * * *